(12) United States Patent
Wang et al.

(10) Patent No.: US 10,700,614 B1
(45) Date of Patent: Jun. 30, 2020

(54) SERIES-TYPE PHOTOVOLTAIC HIGH-VOLTAGE DC GRID-CONNECTED CONVERTER TOPOLOGICAL CIRCUIT AND MODULATION METHOD THEREOF

(71) Applicant: INSTITUTE OF ELECTRICAL ENGINEERING, CHINESE ACADEMY OF SCIENCES, Beijing (CN)

(72) Inventors: Huan Wang, Beijing (CN); Xinke Huang, Beijing (CN); Yibo Wang, Beijing (CN)

(73) Assignee: INSTITUTE OF ELECTRICAL ENGINEERING, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/666,450

(22) Filed: Oct. 29, 2019

Related U.S. Application Data

(63) Continuation of application No. PCT/CN2019/113546, filed on Oct. 28, 2019.

(30) Foreign Application Priority Data

Oct. 25, 2019 (CN) .......................... 2019 1 1024299

(51) Int. Cl.
  *H02M 3/335* (2006.01)
  *H02M 1/34* (2007.01)
  *H02J 3/38* (2006.01)

(52) U.S. Cl.
  CPC ......... *H02M 3/33576* (2013.01); *H02M 1/34* (2013.01); *H02J 3/381* (2013.01); *H02J 2300/24* (2020.01); *H02M 3/33507* (2013.01)

(58) Field of Classification Search
  CPC ......... H02M 3/33576; H02M 3/33507; H02M 1/34; H02J 3/381; H02J 2300/24
  See application file for complete search history.

(56) References Cited

U.S. PATENT DOCUMENTS

| | | | |
|---|---|---|---|
| 2012/0275196 A1* | 11/2012 | Chapman | H02M 3/33507 363/17 |
| 2016/0380425 A1* | 12/2016 | Chapman | H02M 3/33569 363/21.01 |

OTHER PUBLICATIONS

Christian A. Rojas, Samir Kouro, Marcelo A. Perez, Javier Echeverria, DC-DC MMC for HVdc Grid Interface of Utility-Scale Photovoltaic Conversion Systems, IEEE Transactions on Industrial Electronics, Jan. 2018, p. 352-362, vol. 65, No. 1.

(Continued)

*Primary Examiner* — Emily P Pham
(74) *Attorney, Agent, or Firm* — Bayramoglu Law Offices LLC

(57) ABSTRACT

A series-type photovoltaic high-voltage direct current (DC) grid-connected converter topological circuit and a modulation method thereof, wherein the topological circuit includes a high-frequency transformer configured to isolate a primary side circuit from a secondary side circuit. The primary side circuit includes a high-frequency full-bridge inverter circuit, an active-clamping circuit, an input capacitor $C_1$, an input diode $D_0$, and a boost inductor $L_1$ and adjusts the boost mode and buck mode of the topological circuit. The secondary side circuit includes a high-frequency rectifying circuit, a filter capacitor $C_3$ and a filter capacitor $C_4$, and rectifies and filters an output voltage of the high-frequency transformer. The secondary side circuit further includes a switch tube $Q_5$, and the switch tube $Q_5$ adjusts the secondary side circuit into a voltage multiplication circuit to double the output voltage of the high-frequency transformer.

20 Claims, 2 Drawing Sheets

(56) References Cited

OTHER PUBLICATIONS

Yushan Liu, Haitham Abu-Rub, Baoming Ge, Front-End Isolated Quasi-Z-Source DC-DC Converter Modules in Series for High-Power Photovoltaic Systems—Part I: Configuration, Operation, and Evaluation, IEEE Transaction on Industrial Electronics, Jan. 2017, p. 347-358, vol. 64, No. 1.

* cited by examiner

SERIES-TYPE PHOTOVOLTAIC HIGH-VOLTAGE DC GRID-CONNECTED CONVERTER TOPOLOGICAL CIRCUIT AND MODULATION METHOD THEREOF

CROSS REFERENCE TO THE RELATED APPLICATIONS

This application is the continuation application of International Application No. PCT/CN2019/113546, filed on Oct. 28, 2019, which is based upon and claims priority to Chinese Patent Application No. 201911024299.3, filed on Oct. 25, 2019, the entire contents of which are incorporated herein by reference.

TECHNICAL FIELD

The present disclosure belongs to the technical field of photovoltaic high voltage converters. More particularly, the present disclosure relates to a series-type photovoltaic high-voltage direct current (DC) grid-connected converter topological circuit and a modulation method thereof.

BACKGROUND

In recent years, the development of photovoltaic power plants tends to be large-scale and centralized. The capacity of China's single photovoltaic power plants has grown from 10 MW in 2008 to 100 MW in 2012. In 2018, the scale of photovoltaic power plants in Golmud has reached 2 GW. However, these power plants are mostly built in remote areas such as deserts and plateaus, which are far from the load center and at the end of the grid, making power transmission difficult.

A photovoltaic DC boost collection and grid connection technique is a new type of photovoltaic power generation technique. By a photovoltaic high-voltage DC grid-connected converter, the low-voltage DC photovoltaic array is boosted into a medium-voltage DC or high-voltage DC to connect to a DC grid. The DC boost grid connection can solve problems such as alternating current grid-connected harmonic resonance and reactive power loss in large-scale photovoltaic generation bases, which is suitable for long-distance power collection of large-scale photovoltaic power generation bases.

In photovoltaic DC boost collection and grid connection systems, employing a connection method where input ends of a plurality of series-type photovoltaic DC boost converters are connected to independent photovoltaic arrays and output ends of the plurality of series-type photovoltaic DC boost converters are connected in series, the systems can realize secondary boost without an additional boost converter, which has low cost, high efficiency, and has obvious technical advantages. In series systems, the series-type photovoltaic DC converter not only needs to have a wide input voltage range to meet requirements of the photovoltaic array, but also needs to have a wide output voltage range, otherwise the maximum power point voltage of the photovoltaic array will not match the output voltage of the converter under some working conditions, resulting in power curtailment.

In order to obtain the wide output voltage range of the converter, some techniques such as the method where a boost circuit is added in addition to a DC isolated conversion circuit to improve the output voltage range of the converter is used[1][2] However, the method increases a circuit conversion link, has a complicated topology, increases the cost and decreases the efficiency. Moreover, the DC isolation conversion link in the method does not use a boost circuit, and the boost ratio is low.

In summary, in the topology scheme of the prior art, the structure is complicated, numerous transformation links are required, the practicability is poor, and the boost ratio is low.

The following literature is the technical background information related to the present disclosure.

[1] Christian A. Rojas, Samir Kouro, Marcelo A. Perez, Javier Echeverria, DC-DC MMC for HVdc Grid Interface of Utility-Scale Photovoltaic Conversion Systems, 201801.

[2] Yushan Liu, Haitham Abu-Rub, Baoming Ge, Front-End Isolated Quasi-Z-Source DC-DC Converter Modules in Series for High-Power Photovoltaic Systems—Part I: Configuration, Operation, and Evaluation, 201701.

SUMMARY

In order to solve the aforementioned problems, that is, in the topology scheme of the prior art, the structure is complicated, numerous transformation links are required, the practicability is poor and the boost ratio is low. The present disclosure provides a series-type photovoltaic high-voltage DC grid-connected converter topological circuit. The topological circuit includes a high-frequency transformer, a primary side circuit and a secondary side circuit.

The high-frequency transformer is configured to isolate the primary side circuit from the secondary side circuit.

The primary side circuit includes a high-frequency full-bridge inverter circuit, an active-clamping circuit, an input capacitor $C_1$, an input diode $D_0$, and a boost inductor $L_1$. Positive and negative poles of a DC side of the high-frequency full-bridge inverter circuit are respectively connected to positive and negative poles of the active-clamping circuit. The positive pole of the input capacitor $C_1$, the anode of the input diode $D_0$ and the positive pole of the boost inductor $L_1$ are connected to the positive pole of an input of the photovoltaic high-voltage DC grid-connected converter topological circuit. The negative pole of the input capacitor $C_1$ is connected to the negative pole of the active-clamping circuit and the negative pole of the input of the photovoltaic high-voltage DC grid-connected converter topological circuit. The negative pole of the input boost inductor $L_1$ is connected to the positive pole of the active-clamping circuit. The cathode of the input diode $D_0$ is connected to the positive pole of a clamping capacitor $C_2$ in the active-clamping circuit.

The secondary side circuit includes a high-frequency rectifying circuit, a filter capacitor $C_3$ and a filter capacitor $C_4$. The positive pole of the high-frequency rectifying circuit is connected to the positive pole of the filter capacitor $C_3$, and the negative pole of the high-frequency rectifying circuit is connected to the negative pole of the filter capacitor $C_4$. The negative pole of the filter capacitor $C_3$ is connected to the positive pole of the filter capacitor $C_4$.

In some preferred embodiments, the high-frequency full-bridge inverter circuit includes a switch tube $Q_1$, a switch tube $Q_2$, a switch tube $Q_3$ and a switch tube $Q_4$.

The positive pole of the switch tube $Q_1$ is connected to the positive pole of the switch tube $Q_3$.

The negative pole of the switch tube $Q_2$ is connected to the negative pole of the switch tube $Q_4$.

The negative pole of the switch tube $Q_1$ and the positive pole of the switch tube $Q_2$ are connected to each other and then connected to one end of a primary side of the high-frequency transformer.

The negative pole of the switch tube $Q_3$ and a positive pole of the switch tube $Q_4$ are connected to each other and then connected to the other end of the primary side of the high-frequency transformer.

In some preferred embodiments, the active-clamping circuit includes a clamping switch tube $Q_0$ and the clamping capacitor $C_2$.

The positive pole of the clamping switch tube $Q_0$ is connected to the positive pole of the clamping capacitor $C_2$.

In some preferred embodiments, the high-frequency rectifying circuit includes the diode $D_1$, the diode $D_2$, the diode $D_3$ and the diode $D_4$.

The cathode of the diode $D_1$ is connected to the cathode of the diode $D_3$.

The anode of the diode $D_2$ is connected to the anode of the diode $D_4$.

The anode of the diode $D_1$ and a cathode of the diode $D_2$ are connected to each other and then connected to one end of a secondary side of the high-frequency transformer.

The anode of the diode $D_3$ and the cathode of the diode $D_4$ are connected to each other and then connected to the other end of the secondary side of the high-frequency transformer.

In some preferred embodiments, the topological circuit further includes a rectifier filter-voltage multiplication adjustment circuit.

The rectifier filter-voltage multiplication adjustment circuit includes a switch tube $Q_5$. The positive pole of the switch tube $Q_5$ is connected to an input end of the high-frequency rectifying circuit, and the negative pole of the switch tube $Q_5$ is connected to the negative pole of the filter capacitor $C_3$ and the positive pole of the filter capacitor $C_4$.

According to another aspect of the present disclosure, a modulation method of the series-type photovoltaic high-voltage DC grid-connected converter topological circuit is provided. Based on the series-type photovoltaic high-voltage DC grid-connected converter topological circuit mentioned above, the modulation method includes the following steps.

step S10: Defining a switching period of the switch tubes $Q_1$, $Q_2$, $Q_3$, $Q_4$ in the high-frequency full-bridge inverter circuit and the clamping switch tube $Q_0$ in the active-clamping circuit in the topological circuit to be T, and obtaining turn-on waveforms of the switch tubes $Q_1$, $Q_2$, $Q_3$, $Q_4$ and the clamping switch tube $Q_0$.

step S20: According to the switching period T of the switch tubes $Q_1$, $Q_2$, $Q_3$, $Q_4$ and the clamping switch tube $Q_0$, and the turn-on waveforms of the switch tubes $Q_1$, $Q_2$, $Q_3$, $Q_4$ and the clamping switch tube $Q_0$, judging whether a turn-on time of the switch tubes $Q_1$ and $Q_3$ is greater than a T/2 period. If yes, jump to step S30, otherwise jump to step S40.

step S30: When the turn-on time of the switch tubes $Q_1$ and $Q_3$ is greater than the T/2 period, the topological circuit is in a boost mode. According to an input control information of the clamping switch tube $Q_0$ under the boost mode, the clamping switch tube $Q_0$ is turned on when the switch tube $Q_1$ or $Q_3$ is turned off, and is turned off when the switch tubes $Q_1$ and $Q_3$ are turned on at the same time. A peak voltage, caused when the switch tube $Q_1$ or $Q_3$ is turned off, is absorbed by the clamping capacitor $C_2$.

step S40: When the turn-on time of the switch tubes $Q_1$ and $Q_3$ is less than the T/2 period, the topological circuit is in a buck mode. According to an input control information of the clamping switch tube $Q_0$ under the buck mode, the clamping switch tube $Q_0$ is turned on for all time.

In some preferred embodiments, the turn-on waveforms of the switch tubes $Q_1$, $Q_2$, $Q_3$ and $Q_4$ are as follows.

During the switching period T, the switch tubes $Q_2$ and $Q_4$ are respectively turned on for T/2 and a phase difference between the switch tubes $Q_2$ and $Q_4$ is 180 degrees. When the switch tubes $Q_1$ and $Q_3$ are turned on, a phase difference between the switch tubes $Q_1$ and $Q_3$ is 180 degrees. The switch tube $Q_1$ has the same phase as the switch tube $Q_4$, and the switch tube $Q_2$ has the same phase as the switch tube $Q_3$.

In some preferred embodiments, when the turn-on time of the switch tubes $Q_1$ and $Q_3$ is greater than the T/2 period and the switch $Q_5$ is turned on, a boost ratio of the topological circuit is $$G_{BOOST} = \frac{V_{OUT}}{V_{IN}} = \frac{n}{1-D}$$

wherein, $G_{BOOST}$ represents the boost ratio under the boost mode, $V_{OUT}$ represents an output voltage of the topological circuit under the boost mode, $V_{IN}$ represents an input voltage of the topological circuit under the boost mode, n represents a ratio of a voltage of the secondary side to a voltage of the primary side in the high-frequency transformer, and D represents a duty ratio of the switch tubes $Q_1$ and $Q_3$.

In some preferred embodiments, when the turn-on time of the switch tubes $Q_1$ and $Q_3$ is less than the T/2 period and the switch tube $Q_5$ is turned off, a boost ratio of the topological circuit is $$G_{BUCK} = \frac{V_{OUT}}{V_{IN}} = 2nD$$

where, $G_{BUCK}$ represents the boost ratio under the buck mode, $V_{OUT}$ represents an output voltage of the topological circuit under the buck mode, $V_{IN}$ represents an input voltage of the topological circuit under the buck mode, n represents a ratio of a voltage of the secondary side to a voltage of the primary side in the high-frequency transformer, and D represents a duty ratio of the switch tubes $Q_1$ and $Q_3$.

In some preferred embodiments, the modulation method is further provided with a rectifier filter-voltage multiplication adjustment step, including obtaining and executing a control information of the switch tube $Q_5$;

when the control information of the switch tube $Q_5$ is that the switch tube $Q_5$ is turned off, rectifying and filtering the output voltage of the high-frequency transformer; and when the control information of the switch tube $Q_5$ is that the switch tube $Q_5$ is turned on, doubling the output voltage of the high-frequency transformer.

The advantages of the present disclosure are as follows.

The series-type photovoltaic high-voltage DC grid-connected converter topological circuit of the present disclosure solves the problem in the prior art that the boost-type circuit with the boosting inductor on the input side cannot be started directly, and an output capacitor needs to be pre-charged, otherwise the overcurrent phenomenon is easy to occur. The present disclosure does not need to pre-charge the output capacitor and can start from zero voltage and then enter the buck operation mode when starting and gradually transitions to the boost output mode to achieve a soft start as the voltage of the output capacitor increases.

The series-type photovoltaic high-voltage DC grid-connected converter topological circuit of the present disclosure can realize a wide variation range of the output voltage by adjusting the duty ratio of the corresponding switch tubes, thereby achieving both boosting and bucking. While realizing the wide variation range of the input voltage and the wide variation range of the series output voltage in the photovoltaic array, the present disclosure can realize a matching of the input voltage and the output voltage by adjusting the topological boost ratio over the wide range(s).

BRIEF DESCRIPTION OF THE DRAWINGS

The other features, objectives and advantages of the present disclosure becomes more apparent by the detailed description of the non-restrictive embodiments, which reference the illustrated drawings.

DETAILED DESCRIPTION OF THE EMBODIMENTS

Figure 1:
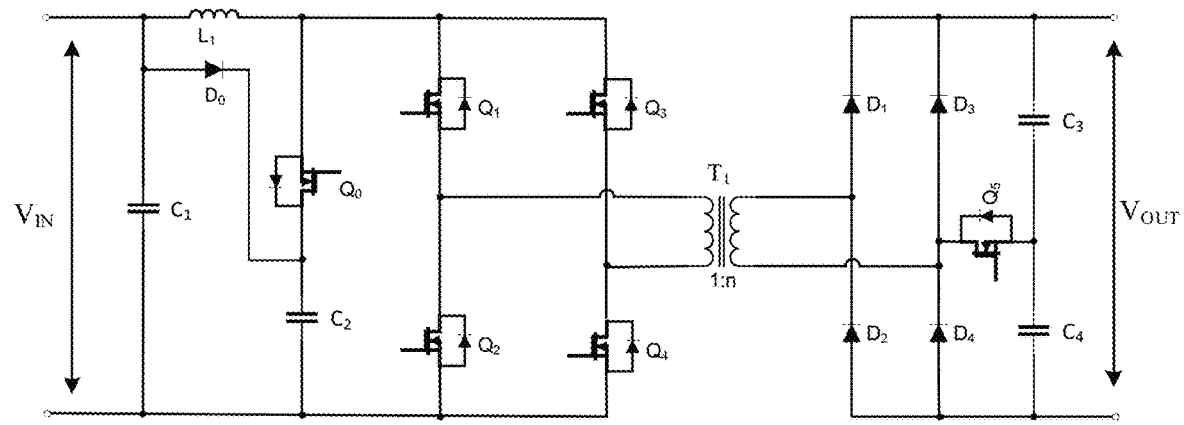
FIG. 1 is a structural diagram of the series-type photovoltaic high-voltage DC grid-connected converter topological circuit according to the present disclosure.

The present disclosure is further described below with reference to the embodiments and the drawings. It should be understood that the specific embodiments described herein are merely illustrative of the present disclosure and are not intended to limit the present disclosure. It should also be noted that, for the convenience of description, only the parts related to the related invention are shown in the drawings.

It should be noted that, on the premise of no conflict, the embodiments in the present disclosure and the features in the embodiments may be combined with each other. The present disclosure is described in detail below with reference to the embodiments and the drawings.

The present disclosure provides a series-type photovoltaic high-voltage DC grid-connected converter topological circuit. The topological circuit includes a high-frequency transformer, a primary side circuit, and a secondary side circuit.

The high-frequency transformer is configured to isolate the primary side circuit and the secondary side circuit.

The primary side circuit includes a high-frequency full-bridge inverter circuit, an active-clamping circuit, the input capacitor $C_1$, the input diode $D_0$, and the boost inductor $L_1$. Positive and negative poles of a DC side of the high-frequency full-bridge inverter circuit are respectively connected to positive and negative poles of the active-clamping circuit. The positive pole of the input capacitor $C_1$, the anode of the input diode $D_0$ and the positive pole of the boost inductor $L_1$ are connected to the positive pole of an input of the photovoltaic high-voltage DC grid-connected converter topological circuit. The negative pole of the input capacitor $C_1$ is connected to the negative pole of the active-clamping circuit and the negative pole of the input of the photovoltaic high-voltage DC grid-connected converter topological circuit. The negative pole of the input boost inductor $L_1$ is connected to the positive pole of the active-clamping circuit. The cathode of the input diode $D_0$ is connected to the positive pole of the clamping capacitor $C_2$ in the active-clamping circuit.

The secondary side circuit includes a high-frequency rectifying circuit, the filter capacitor $C_3$, and the filter capacitor $C_4$. The positive pole of the high-frequency rectifying circuit is connected to the positive pole of the filter capacitor $C_3$, and the negative pole of the high-frequency rectifying circuit is connected to the negative pole of the filter capacitor $C_4$. The negative pole of the filter capacitor $C_3$ is connected to the positive pole of the filter capacitor $C_4$.

In order to illustrate the series-type photovoltaic high-voltage DC grid-connected converter topological circuit of the present disclosure more clearly, each module in the embodiment of the present disclosure is described in detail below with reference to FIG. 1.

The series-type photovoltaic high-voltage DC grid-connected converter topological circuit of the present invention includes a high-frequency transformer, a primary side circuit, and a secondary side circuit, and each module is described in detail as follows.

The high-frequency transformer is configured to isolate the primary side circuit from the secondary side circuit.

The high-frequency transformer is generally a power transformer with a working frequency over 1 kHz, which is mainly used as a high-frequency switching power transformer in a high-frequency switching power supply and also as a high-frequency inverter power transformer in a high-frequency inverter power supply and a high-frequency inverter welding machine.

According to one embodiment of the present disclosure, the high-frequency transformer is an isolation transformer with a boost function. The isolation transformer refers to a transformer with an electrical isolation between an input winding and an output winding. The isolation transformer is configured to avoid an accidental simultaneous contact with a charged body and isolates the current in the primary coil from the current in the secondary coil.

The primary side circuit includes a high-frequency full-bridge inverter circuit, an active-clamping circuit, the input capacitor $C_1$, the input diode $D_0$, and the boost inductor $L_1$. Positive and negative poles of a DC side of the high-frequency full-bridge inverter circuit are respectively connected to positive and negative poles of the active-clamping circuit. The positive pole of the input capacitor $C_1$, the anode of the input diode $D_0$ and the positive pole of the boost inductor $L_1$ are connected to the positive pole of an input of the photovoltaic high-voltage DC grid-connected converter topological circuit. The negative pole of the input capacitor $C_1$ is connected to the negative pole of the active-clamping circuit and the negative pole of the input of the photovoltaic high-voltage DC grid-connected converter topological circuit. The negative pole of the input boost inductor $L_1$ is connected to the positive pole of the active-clamping circuit. The cathode of the input diode $D_0$ is connected to the positive pole of the clamping capacitor $C_2$ in the active-clamping circuit.

The high-frequency full-bridge inverter circuit includes the switch tube $Q_1$, the switch tube $Q_2$, the switch tube $Q_3$, and the switch tube $Q_4$.

The positive pole of the switch tube $Q_1$ is connected to the positive pole of the switch tube $Q_3$. The negative pole of the switch tube $Q_2$ is connected to the negative pole of the switch tube $Q_4$. The negative pole of the switch tube $Q_1$ and the positive pole of the switch tube $Q_2$ are connected to each other and then connected to one end of the primary side of the high-frequency transformer. The negative pole of the switch tube $Q_3$ and the positive pole of the switch tube $Q_4$ are connected to each other and then connected to the other end of the primary side of the high-frequency transformer.

The active-clamping circuit includes the clamping switch tube $Q_0$ and the clamping capacitor $C_2$.

The positive pole of the clamping switch tube $Q_0$ is connected to the positive pole of the clamping capacitor $C_2$.

The secondary side circuit includes a high-frequency rectifying circuit, the filter capacitor $C_3$, and the filter capacitor $C_4$. The positive pole of the high-frequency rectifying circuit is connected to the positive pole of the filter capacitor $C_3$, and the negative pole of the high-frequency rectifying circuit is connected to the negative pole of the filter capacitor $C_4$. The negative pole of the filter capacitor $C_3$ is connected to the positive pole of the filter capacitor $C_4$.

The high-frequency rectifying circuit includes the diode $D_1$, the diode $D_2$, the diode $D_3$ and the diode $D_4$.

The cathode of the diode $D_1$ is connected to the cathode of the diode $D_3$. The anode of the diode $D_2$ is connected to the anode of the diode $D_4$. The anode of the diode $D_1$ and the cathode of the diode $D_2$ are connected to each other and then connected to one end of the secondary side of the high-frequency transformer. The anode of the diode $D_3$ and the cathode of the diode $D_4$ are connected to each other and then connected to the other end of the secondary side of the high-frequency transformer.

The voltage of the clamping capacitor $C_2$ is controlled by adjusting the duty ratio of the upper bridge arm switch tubes $Q_1$ and $Q_3$ on the high-frequency full-bridge inverter circuit on the primary side of the transformer, thereby turning on/off the diode $D0$. When the duty ratio of the switch tubes $Q_1$ and $Q_3$ is greater than 0.5, the voltage of the capacitor $C_2$ is greater than the voltage of the capacitor $C_1$, the diode $D_0$ —is turned off and the topological circuit of the present disclosure is in a boost mode. When the duty ratio of the switch tubes $Q_1$ and $Q_3$ is less than 0.5, the diode $D_0$ is turned on, the boost inductor $L_1$ is bypassed, and the topological circuit of the present disclosure is in a buck mode.

The topological circuit further includes a rectifier filter-voltage multiplication adjustment circuit.

The rectifier filter-voltage multiplication adjustment circuit includes the switch tube $Q_5$. The positive pole of the switch tube $Q_5$ is connected to the input end of the high-frequency rectifying circuit, and the negative pole of the switch tube $Q_5$ is connected to the negative pole of the filter capacitor $C_3$ and the positive pole of the filter capacitor $C_4$.

When the switch tube $Q_s$ is turned off, the secondary side circuit becomes a rectifier filter circuit. When the switch tube $Q_5$ is turned on, the output voltage can be doubled to further increase the output voltage range.

According to a second embodiment of the present disclosure, a modulation method of the series-type photovoltaic high-voltage DC grid-connected converter topological circuit includes the following steps.

Step S10: The switching period of the switch tubes $Q_1$, $Q_2$, $Q_3$, $Q_4$ in the high-frequency full-bridge inverter circuit and the clamping switch tube $Q_0$ in the active-clamping circuit in the topological circuit is defined to be T and the turn-on waveforms of the switch tubes $Q_1$, $Q_2$, $Q_3$, $Q_4$ and the clamping switch tube $Q_0$ are obtained.

The turn-on waveforms of the switch tubes $Q_1$, $Q_2$, $Q_3$ and $Q_4$ are as follows.

During the switching period T, the switch tubes $Q_2$ and $Q_4$ are respectively turned on for T/2 and a phase difference between the switch tubes $Q_2$ and $Q_4$ is 180 degrees. When the switch tubes $Q_1$ and $Q_3$ are turned on, a phase difference between the switch tubes $Q_1$ and $Q_3$ is 180 degrees. The switch tube $Q_1$ has the same phase as the switch tube $Q_4$ and the switch tube $Q_2$ has the same phase as the switch tube $Q_3$.

Step S20: According to the switching period T and turn-on waveforms of the switch tubes $Q_1$, $Q_2$, $Q_3$, $Q_4$ and the clamping switch tube $Q_0$, if the period of the turn-on time of the switch tubes $Q_1$ and $Q_3$ is greater than the T/2 is determined, jump to step S30, otherwise jump to step S40.

Step S30: When the turn-on time of the switch tubes $Q_1$ and $Q_3$ is greater than the T/2 period, the topological circuit is in the boost mode. According to an input control information of the clamping switch tube $Q_0$ under the boost mode, the clamping switch tube $Q_0$ is turned on when the switch tube $Q_1$ or $Q_3$ is turned off, and is turned off when the switch tubes $Q_1$ and $Q_3$ are turned on at the same time. A peak voltage, caused when the switch tube $Q_1$ or $Q_3$ is turned off, is absorbed by the clamping capacitor $C_2$.

Figure 2:
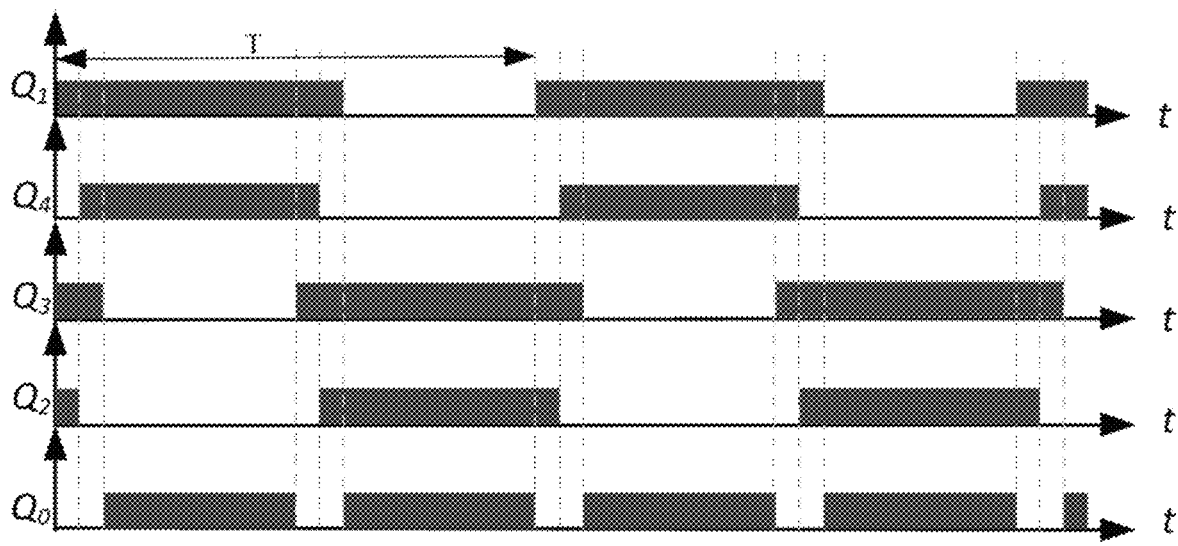
FIG. 2 shows modulation waveforms of switch tubes under a boost mode in the series-type photovoltaic high-voltage DC grid-connected converter topological circuit according to one embodiment of the present disclosure.

FIG. 2 shows the modulation waveforms of the switch tubes under the boost mode in the series-type photovoltaic high-voltage DC grid-connected converter topological circuit according to one embodiment of the present disclosure. T is defined as the switching period of the switch tubes $Q_1$, $Q_2$, $Q_3$, $Q_4$ and the clamping switch tube $Q_0$. The clamping switch tube $Q_0$ is turned on twice per switching period. When the switch tube $Q_1$ or $Q_3$ is turned off, the clamping switch tube $Q_0$ is turned on. When the switch tubes $Q_1$ and $Q_3$ are turned on at the same time, the clamping switch tube $Q_0$ is turned off, thereby realizing the function of absorbing the peak voltage caused when the switch tube $Q_1$ or $Q_3$ is turned off by the clamping capacitor $C_2$.

When the turn-on time of the switch tubes $Q_1$ and $Q_3$ is greater than the T/2 period and the switch tube $Q_5$ is turned on, the boost ratio of the topological circuit is obtained as shown in equation (1)

$$G_{BOOST} = \frac{V_{OUT}}{V_{IN}} = \frac{n}{1-D} \qquad \text{Equation (1)}$$

where, $G_{BOOST}$ represents the boost ratio under the boost mode, $V_{OUT}$ represents an output voltage of the topological circuit under the boost mode, $V_{IN}$ represents an input voltage of the topological circuit under the boost mode, n represents a ratio of a voltage of the secondary side to a voltage of the primary side in the high-frequency transformer, D represents a duty ratio of the switch tubes $Q_1$ and $Q_3$.

Step S40: When the turn-on time of the switch tubes $Q_1$ and $Q_3$ is less than the T/2 period, the topological circuit is in the buck mode. According to an input control information of the clamping switch tube $Q_0$ under the buck mode, the clamping switch tube $Q_0$ is turned on for all time.

Figure 3:
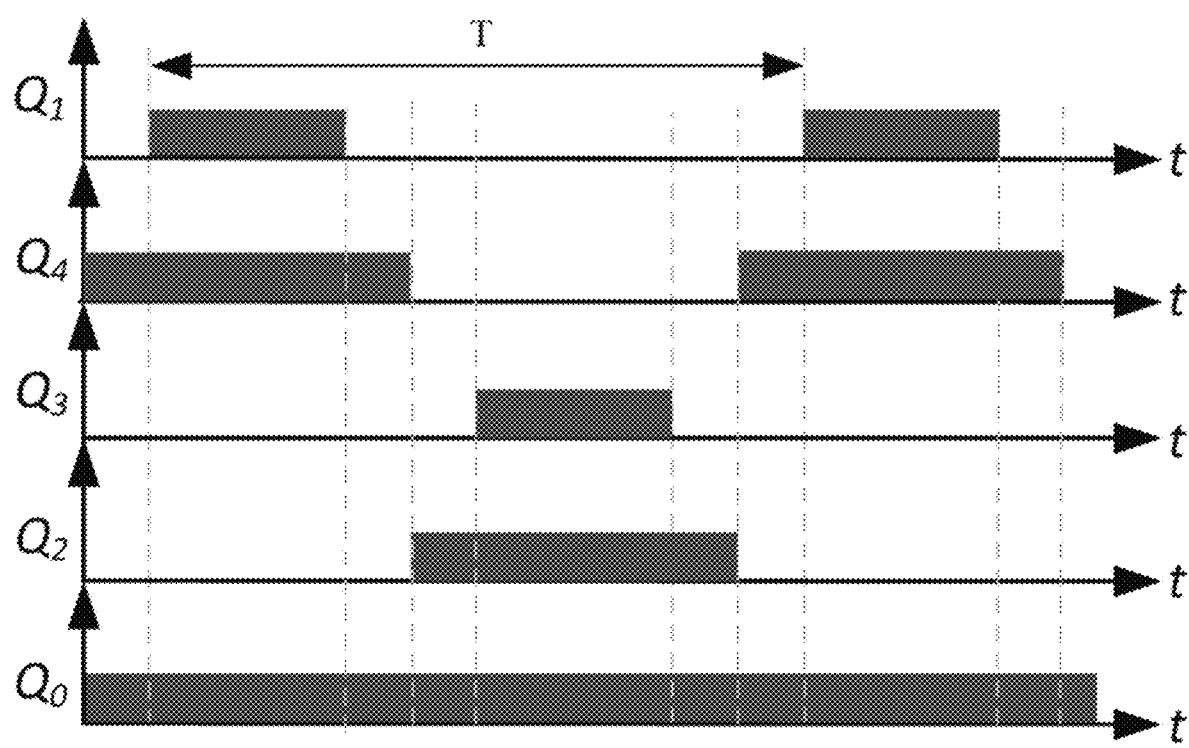
FIG. 3 shows modulation waveforms of switch tubes under a buck mode in the series-type photovoltaic high-voltage DC grid-connected converter topological circuit according to one embodiment of the present disclosure.

FIG. 3 shows the modulation waveforms of the switch tubes under the buck mode in the series-type photovoltaic high-voltage DC grid-connected converter topological circuit according to one embodiment of the present disclosure. T presents the switching period of the switch tubes $Q_1$, $Q_2$, $Q_3$, $Q_4$ and the clamping switch tube $Q_0$. The turn-on time of the switch tubes $Q_1$ and $Q_3$ is less than the T/2 period and the clamping switch tube $Q_0$ is turned on for all time.

When the turn-on time of the switch tubes $Q_1$ and $Q_3$ is less than the T/2 period and the switch tube $Q_5$ is turned off, the boost ratio of the topological circuit is obtained as shown in equation (2)

$$G_{BUCK} = \frac{V_{OUT}}{V_{IN}} = 2nD \qquad \text{Equation (2)}$$

where, $G^{BUCK}$ represents the boost ratio under the buck mode, $V_{OUT}$ represents an output voltage of the topological circuit under the buck mode, $V_{IN}$ represents an input voltage of the topological circuit under the buck mode, n represents a ratio of a voltage of the secondary side to a voltage of the primary side in the high-frequency transformer, D represents a duty ratio of the switch tubes $Q_1$ and $Q_3$.

The modulation method is further provided with a rectifier filter-voltage multiplication adjustment step, including obtaining and executing a control information of the switch tube $Q_5$;

when the control information of the switch tube $Q_5$ is that the switch tube $Q_5$ is turned off, rectifying and filtering the output voltage of the high-frequency transformer; and when the control information of the switch tube $Q_5$ is that the switch tube $Q_5$ is turned on, doubling the output voltage of the high-frequency transformer.

When the switch tube $Q_5$ is turned off, the secondary side circuit is a rectifier filter circuit, and the output voltage of the high-frequency transformer is rectified and filtered. When the switch tube $Q_5$ is turned on, the output voltage of the high-frequency transformer is doubled to further increase the output voltage range.

It can be clearly understood by those skilled in the art that, for the convenience and brevity of the description, the specific working process and related description of the method mentioned above can refer to the corresponding process in the aforementioned embodiment(s) and is not further described herein.

It should be noted that the modulation method of the series-type photovoltaic high-voltage DC grid-connected converter topological circuit in the above embodiment is only illustrated by the division of the above steps. In practical applications, the above-mentioned function allocation can be completed by different steps as needed. That is, the steps in the embodiment(s) of the present disclosure can be further divided or combined. For example, the steps of the above embodiment(s) may be combined into one step, or may be further divided into multiple sub-steps to perform all or part of the functions described above. The names of the steps involved in the embodiment(s) of the present disclosure are merely for distinguishing the respective steps and are not to be construed as limiting the present invention.

The terms "first" and "second" are used to distinguish similar objects, and are not intended to describe or indicate a particular order or sequence.

The term "include" or any other similar language aims to cover a non-exclusive contain. That is, a process, method, article or equipment/device that includes a series of elements includes not only those elements, but also other elements that are not explicitly listed, or the elements inherent in the process, method, article or equipment/device.

Heretofore, the technical solutions of the present disclosure have been described with reference to the preferred embodiments shown in the drawings, but it is obvious to those skilled in the art that the protection scope of the present disclosure is not limited to the specific embodiments. Those skilled in the art can make equivalent modifications or alternatives to the related technical features without departing from the principles of the present disclosure, and these modifications and alternatives shall fall within the protection scope of the present disclosure.

What is claimed is:

1. A series-type photovoltaic high-voltage direct current (DC) grid-connected converter topological circuit, comprising a high-frequency transformer, a primary side circuit and a secondary side circuit, wherein, the high-frequency transformer is configured to isolate the primary side circuit from the secondary side circuit;

the primary side circuit comprises a high-frequency full-bridge inverter circuit, an active-clamping circuit, an input capacitor, an input diode, and a boost inductor; a positive pole and a negative pole of a DC side of the high-frequency full-bridge inverter circuit are respectively connected to a positive pole and a negative pole of the active-clamping circuit; a positive pole of the input capacitor, an anode of the input diode and a positive pole of the boost inductor are connected to a positive pole of an input of the series-type photovoltaic high-voltage DC grid-connected converter topological circuit; a negative pole of the input capacitor is connected to a negative pole of the active-clamping circuit and a negative pole of the input of the series-type photovoltaic high-voltage DC grid-connected converter topological circuit; a negative pole of the input boost inductor is connected to a positive pole of the active-clamping circuit; a cathode of the input diode is connected to a positive pole of a clamping capacitor in the active-clamping circuit; and the secondary side circuit comprises a high-frequency rectifying circuit, a first filter capacitor and a second filter capacitor; a positive pole of the high-frequency rectifying circuit is connected to a positive pole of the first filter capacitor, and a negative pole of the high-frequency rectifying circuit is connected to a negative pole of the second filter capacitor; and a negative pole of the first filter capacitor is connected to a positive pole of the second filter capacitor.

2. The series-type photovoltaic high-voltage DC grid-connected converter topological circuit according to claim 1, wherein, the high-frequency full-bridge inverter circuit comprises a first switch tube, a second switch tube, a third switch tube and a fourth switch tube;

a positive pole of the first switch tube is connected to a positive pole of the third switch tube;

a negative pole of the second switch tube is connected to a negative pole of the fourth switch tube;

a negative pole of the first switch tube and a positive pole of the second switch tube are connected to each other and then connected to a first end of a primary side of the high-frequency transformer;

a negative pole of the third switch tube and a positive pole of the fourth switch tube are connected to each other and then connected to a second end of the primary side of the high-frequency transformer.

3. The series-type photovoltaic high-voltage DC grid-connected converter topological circuit according to claim 2, wherein, the series-type photovoltaic high-voltage DC grid-connected converter topological circuit further comprises the rectifier filter-voltage multiplication adjustment circuit;

the rectifier filter-voltage multiplication adjustment circuit comprises the fifth switch tube; the positive pole of the fifth switch tube is connected to the input end of the high-frequency rectifying circuit, and the negative pole of the fifth switch tube is connected to the negative pole of the first filter capacitor and the positive pole of the second filter capacitor.

4. The series-type photovoltaic high-voltage DC grid-connected converter topological circuit according to claim 1, wherein, the active-clamping circuit comprises a clamping switch tube and the clamping capacitor;

a positive pole of the clamping switch tube is connected to a positive pole of the clamping capacitor.

5. The series-type photovoltaic high-voltage DC grid-connected converter topological circuit according to claim 4, wherein, the series-type photovoltaic high-voltage DC grid-connected converter topological circuit further comprises the rectifier filter-voltage multiplication adjustment circuit;

the rectifier filter-voltage multiplication adjustment circuit comprises the fifth switch tube; the positive pole of the fifth switch tube is connected to the input end of the high-frequency rectifying circuit, and the negative pole of the fifth switch tube is connected to the negative pole of the first filter capacitor and the positive pole of the second filter capacitor.

6. The series-type photovoltaic high-voltage DC grid-connected converter topological circuit according to claim 1, wherein, the high-frequency rectifying circuit comprises a first diode, a second diode, a third diode and a fourth diode;

a cathode of the first diode is connected to a cathode of the third diode;

an anode of the second diode is connected to an anode of the fourth diode;

an anode of the first diode and a cathode of the second diode are connected to each other and then connected to a first end of a secondary side of the high-frequency transformer; and an anode of the third diode and a cathode of the fourth diode are connected to each other and then connected to a second end of the secondary side of the high-frequency transformer.

7. The series-type photovoltaic high-voltage DC grid-connected converter topological circuit according to claim 6, wherein, the series-type photovoltaic high-voltage DC grid-connected converter topological circuit further comprises the rectifier filter-voltage multiplication adjustment circuit;

the rectifier filter-voltage multiplication adjustment circuit comprises the fifth switch tube; the positive pole of the fifth switch tube is connected to the input end of the high-frequency rectifying circuit, and the negative pole of the fifth switch tube is connected to the negative pole of the first filter capacitor and the positive pole of the second filter capacitor.

8. The series-type photovoltaic high-voltage DC grid-connected converter topological circuit according to claim 1, wherein, the series-type photovoltaic high-voltage DC grid-connected converter topological circuit further comprises a rectifier filter-voltage multiplication adjustment circuit;

the rectifier filter-voltage multiplication adjustment circuit comprises a fifth switch tube; a positive pole of the fifth switch tube is connected to an input end of the high-frequency rectifying circuit, and a negative pole of the fifth switch tube is connected to the negative pole of the first filter capacitor and the positive pole of the second filter capacitor.

9. A method for modulating a series-type photovoltaic high-voltage DC grid-connected converter topological circuit according to claim 1, comprising:

step S10: defining a switching period of the first switch tube, the second switch tube, the third switch tube and the fourth switch tube in the high-frequency full-bridge inverter circuit and the clamping switch tube in the active-clamping circuit in the series-type photovoltaic high-voltage DC grid-connected converter topological circuit to be T, and obtaining turn-on waveforms of the first switch tube, the second switch tube, the third switch tube, the fourth switch tube and the clamping switch tube;

step S20: according to the switching period T of the first switch tube, the second switch tube, the third switch tube, the fourth switch tubes and the clamping switch tube, and the turn-on waveforms of the first switch tube, the second switch tube, the third switch tube, the fourth switch tubes and the clamping switch tube, judging whether a turn-on time of the first switch tube and the third switch tubes is greater than a T/2 period, and when the turn-on time is greater than the T/2 period, go to step S30, otherwise go to step S40;

step S30: when the turn-on time of the first switch tube and the third switch tubes is greater than the T/2 period, and the series-type photovoltaic high-voltage DC grid-connected converter topological circuit is in a boost mode, according to an input control information of the clamping switch tube under the boost mode, controlling the clamping switch tube to be turned on when the first switch tube or the third switch tube is turned off, and controlling the clamping switch tube to be turned off when the first switch tubes and the third switch tube are turned on at the same time; absorbing, by the clamping capacitor, a peak voltage caused when the first switch tube or the third switch tube is turned off; and step S40: when the turn-on time of the first switch tubes and the third switch tube is less than the T/2 period, and the series-type photovoltaic high-voltage DC grid-connected converter topological circuit is in a buck mode, according to an input control information of the clamping switch tube under the buck mode, controlling the clamping switch tube to be turned on for all time.

10. The method for modulating the series-type photovoltaic high-voltage DC grid-connected converter topological circuit according to claim 9, wherein, the turn-on waveforms of the first switch tube, the second switch tube, the third switch tube, the fourth switch tube are as follows:

during the switching period T, the second switch tubes and the fourth switch tube are respectively turned on for T/2, a phase difference between the second switch tubes and the fourth switch tube is 180 degrees; when the first switch tube and the third switch tube are turned on, a phase difference between the first switch tubes and the third switch tube is 180 degrees; the first switch tube has a same phase as the fourth switch tube, and the second switch tube has a same phase as the third switch tube.

11. The method for modulating the series-type photovoltaic high-voltage DC grid-connected converter topological circuit according to claim 9, wherein, when the turn-on time of the first switch tube and the third switch tube is greater than the T/2 period and a fifth switch tube is turned on, a boost ratio of the series-type photovoltaic high-voltage DC grid-connected converter topological circuit is:

$$G_{BOOST} = \frac{V_{OUT}}{V_{IN}} = \frac{n}{1-D}$$

wherein, $G_{BOOST}$ represents the boost ratio under the boost mode, $V_{OUT}$ represents an output voltage of the series-type photovoltaic high-voltage DC grid-connected converter topological circuit under the boost mode, $V_{IN}$ represents an input voltage of the series-type photovoltaic high-voltage DC grid-connected converter topological circuit under the boost mode, n represents a ratio of a voltage of the secondary side to a voltage of the primary side in the high-frequency transformer, and D represents a duty ratio of the first switch tubes and the third switch tube.

12. The method for modulating the series-type photovoltaic high-voltage DC grid-connected converter topological circuit according to claim 9, wherein, when the turn-on time of the first switch tube and the third switch tube is less than the T/2 period and a fifth switch tube is turned off, a boost ratio of the series-type photovoltaic high-voltage DC grid-connected converter topological circuit is:

$$G_{BUCK} = \frac{V_{OUT}}{V_{IN}} = 2nD$$

wherein, $G_{BUCK}$ represents the boost ratio under the buck mode, $V_{OUT}$ represents an output voltage of the series-type photovoltaic high-voltage DC grid-connected converter topological circuit under the buck mode, $V_{IN}$ represents an input voltage of the series-type photovoltaic high-voltage DC grid-connected converter topological circuit under the buck mode, n represents a ratio of a voltage of the secondary side to a voltage of the primary side in the high-frequency transformer, and D represents a duty ratio of the first switch tube and the third switch tube.

13. The method for modulating the series-type photovoltaic high-voltage DC grid-connected converter topological circuit according to claim 9, wherein, the method is further provided with a rectifying filter-voltage multiplication adjustment step, comprising:
  obtaining and executing a control information of a fifth switch tube;
  when the control information of the fifth switch tube is that the fifth switch tube is turned off, rectifying and filtering an output voltage of the high-frequency transformer; and
  when the control information of the fifth switch tube is that the fifth switch tube is turned on, doubling the output voltage of the high-frequency transformer.

14. The method for modulating the series-type photovoltaic high-voltage DC grid-connected converter topological circuit according to claim 9, wherein, the high-frequency full-bridge inverter circuit comprises the first switch tube, the second switch tube, the third switch tube and the fourth switch tube;
  the positive pole of the first switch tube is connected to the positive pole of the third switch tube;
  the negative pole of the second switch tube is connected to the negative pole of the fourth switch tube;
  the negative pole of the first switch tube and the positive pole of the second switch tube are connected to each other and then connected to the first end of the primary side of the high-frequency transformer;
  the negative pole of the third switch tube and the positive pole of the fourth switch tube are connected to each other and then connected to the second end of the primary side of the high-frequency transformer.

15. The method for modulating the series-type photovoltaic high-voltage DC grid-connected converter topological circuit according to claim 9, wherein, the active-clamping circuit comprises the clamping switch tube and the clamping capacitor;
  the positive pole of the clamping switch tube is connected to the positive pole of the clamping capacitor.

16. The method for modulating the series-type photovoltaic high-voltage DC grid-connected converter topological circuit according to claim 9, wherein, the high-frequency rectifying circuit comprises the first diode, the second diode, the third diode and the fourth diode;
  the cathode of the first diode is connected to the cathode of the third diode;
  the anode of the second diode is connected to the anode of the fourth diode;
  the anode of the first diode and the cathode of the second diode are connected to each other and then connected to the first end of the secondary side of the high-frequency transformer; and
  the anode of the third diode and the cathode of the fourth diode are connected to each other and then connected to the second end of the secondary side of the high-frequency transformer.

17. The method for modulating the series-type photovoltaic high-voltage DC grid-connected converter topological circuit according to claim 9, wherein, the series-type photovoltaic high-voltage DC grid-connected converter topological circuit further comprises the rectifier filter-voltage multiplication adjustment circuit;
  the rectifier filter-voltage multiplication adjustment circuit comprises the fifth switch tube; the positive pole of the fifth switch tube is connected to the input end of the high-frequency rectifying circuit, and the negative pole of the fifth switch tube is connected to the negative pole of the first filter capacitor and the positive pole of the second filter capacitor.

18. The method for modulating the series-type photovoltaic high-voltage DC grid-connected converter topological circuit according to claim 10, wherein, the method is further provided with the rectifying filter-voltage multiplication adjustment step, comprising:
  obtaining and executing the control information of the fifth switch tube;
  when the control information of the fifth switch tube is that the fifth switch tube is turned off, rectifying and filtering the output voltage of the high-frequency transformer; and
  when the control information of the fifth switch tube is that the fifth switch tube is turned on, doubling the output voltage of the high-frequency transformer.

19. The method for modulating the series-type photovoltaic high-voltage DC grid-connected converter topological circuit according to claim 11, wherein, the method is further provided with the rectifying filter-voltage multiplication adjustment step, comprising:
  obtaining and executing the control information of the fifth switch tube;
  when the control information of the fifth switch tube is that the fifth switch tube is turned off, rectifying and filtering the output voltage of the high-frequency transformer; and
  when the control information of the fifth switch tube is that the fifth switch tube is turned on, doubling the output voltage of the high-frequency transformer.

20. The method for modulating the series-type photovoltaic high-voltage DC grid-connected converter topological circuit according to claim 12, wherein, the method is further provided with the rectifying filter-voltage multiplication adjustment step, comprising:
  obtaining and executing the control information of the fifth switch tube;
  when the control information of the fifth switch tube is that the fifth switch tube is turned off, rectifying and filtering the output voltage of the high-frequency transformer; and when the control information of the fifth switch tube is that the fifth switch tube is turned on, doubling the output voltage of the high-frequency transformer.

\* \* \* \* \*